(12) United States Patent
Tree

(10) Patent No.: US 6,650,534 B2
(45) Date of Patent: Nov. 18, 2003

(54) E-MARKER DEVICE WITH CORD AND PLUG ATTACHMENT

(75) Inventor: John Tree, London (GB)

(73) Assignees: Sony Corporation, Tokyo (JP); Sony Electronics, Park Ridge, NJ (US)

( * ) Notice: Subject to any disclaimer, the term of this patent is extended or adjusted under 35 U.S.C. 154(b) by 306 days.

(21) Appl. No.: 09/827,690

(22) Filed: Apr. 6, 2001

(65) Prior Publication Data

US 2002/0147698 A1 Oct. 10, 2002

(51) Int. Cl.[7] .................................................. G06F 1/16
(52) U.S. Cl. ........................ 361/686; 361/683; 345/157; 707/1; 707/104.1
(58) Field of Search ................................ 361/683, 686, 361/684, 685; 345/157, 163, 179, 164–165, 156; 248/118, 118.1, 118.3, 118.5; 455/568, 569, 566, 559, 556–567, 575; 341/122; 707/1, 104.1; 709/201

(56) References Cited

U.S. PATENT DOCUMENTS

| | | | | |
|---|---|---|---|---|
| 6,088,021 A | * | 7/2000 | Yong | 345/163 |
| 6,144,864 A | * | 11/2000 | Lands et al. | 455/569 |
| 6,290,517 B1 | * | 9/2001 | Anderson | 439/131 |
| 6,304,249 B1 | * | 10/2001 | Derocher et al. | 345/163 |
| 6,392,635 B1 | * | 5/2002 | Snyder | 345/163 |

* cited by examiner

*Primary Examiner*—Michael Datskovsky
(74) *Attorney, Agent, or Firm*—Valley Oak Law

(57) ABSTRACT

An electronic music marker device is provided with a cord and a plug coupled to the device housing such that the cord and the plug are adaptable so as to fit into the device housing with a cap to enclose and conceal the cord and plug. The cap is coupled to the housing by a hinge and lock mechanism such that when unlocked, the cap can be opened and the retractable cord with the plug such as a USB port attached thereto, can be released from the device housing to connect to an external device.

21 Claims, 3 Drawing Sheets

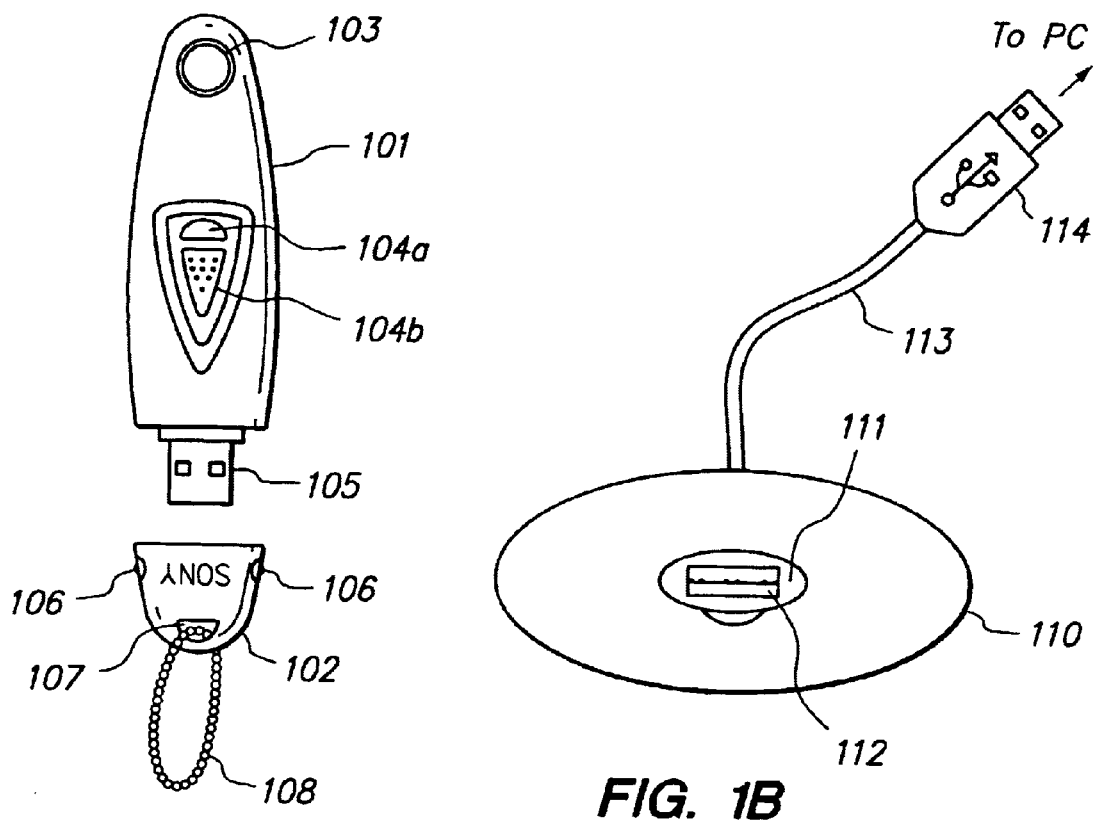
FIG. 1A
FIG. 1B
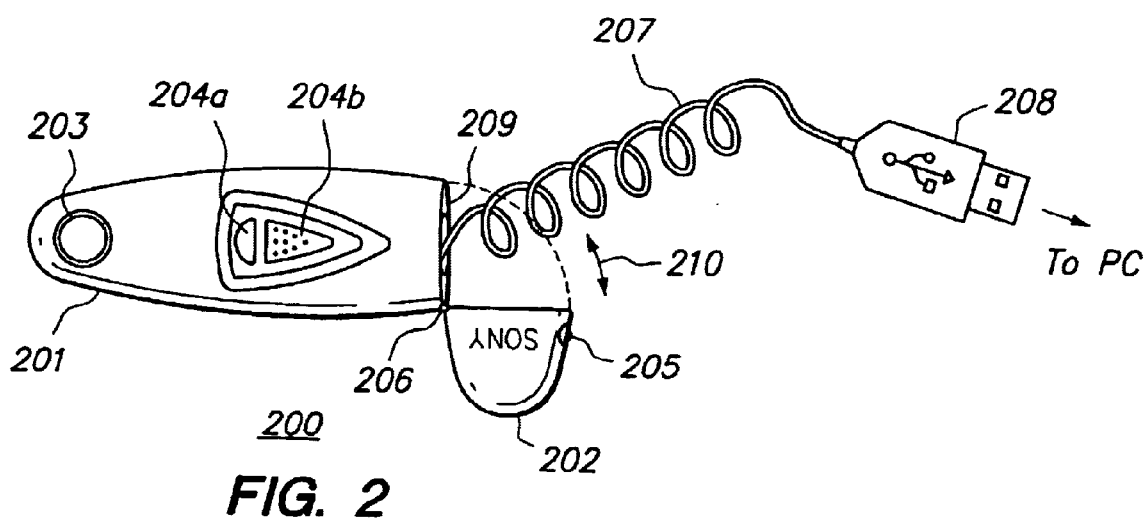
FIG. 2

E-MARKER DEVICE WITH CORD AND PLUG ATTACHMENT

BACKGROUND OF THE INVENTION

1. Field of the Invention

The present invention relates to electronic devices. More particularly, the present invention relates to electronic music markers with integrated communication port.

2. Description of the Related Art

With rapid increase in portable electronic devices such as personal digital assistants (PDAs) and WAP (Wireless Application Protocol) enabled mobile telephones, there has been a steady increase in these devices capable of performing more operations.

Sony Corporation and its U.S. subsidiary, Sony Electronics, Inc., introduced a so called e-marker which is capable of "bookmarking" a music clip while being played on a radio and is capable of recalling the information related to the bookmarked music clip such as the name of the song, the artist, the album containing the song and so on. Using the e-marker, a user can conveniently access the music clip information that the user listened to on the radio at a later time without the need to memorize the information or wait hopefully for the disc jockey on the radio station to provide that information. In this manner, if the user wants to, for example, purchase the music album which the user has marked using the e-marker, the user can easily identify the necessary information related to the marked music clip from the e-marks provided by the e-marker.

The presently available e-marker devices are provided with a USB port for connection to a personal computer and the like for accessing the user's e-marker account over an internet connection. The existing configuration of the e-marker devices is such that the device itself in its entirely must be plugged into the cradle which, in turn, is connected to the personal computer's input port such as a USB port, thus allowing synchronization of the data stored in the e-marker device with the user's e-marker account accessed at www.emarker.com website.

Referring to FIG. 1, there is shown e-marker device 1A and cradle 1B. E-marker device 1A is provided with a housing comprising body 101 and cap 102. Body 101 is provided with e-mark button 103 which is configured for user input commands. Also, as shown, there are provided on body 101 display panels 104a and 104b which are configured to display the number of user inputted e-marks and the type of registered broadcast station for the corresponding e-marks, respectively. Finally, body 101 includes USB port 105 which is permanently fixed onto body 101 such that, as will be discussed in further detail below, body 101 may be placed on top of cradle 1B with USB port 105 capable of being plugged into the corresponding port on cradle 1B.

Cap 102 can be attached to body 101 when access to USB port 105 is unnecessary. As shown, cap 102 is provided with a pair of release/lock buttons 106 on either side of cap 102 such that by depressing release/lock buttons 106 when cap 102 is locked with body 101, cap 102 can be released from a locked position and access to USB port 105 can be obtained. Furthermore, cap 102 is provided with hole 107 substantially at its edge position such that link chain 108 can be looped through hole 107 to allow the user to attach the e-marker device to a key chain or the like.

Referring back to FIG. 1, cradle 1B is provided with cradle base 110 substantially flat on its bottom surface (not shown) to rest cradle 1B on a flat surface such as a desktop and a book shelf. On the other side of the bottom surface of cradle 1B is receiving section 111 substantially positioned on the middle of cradle 1B, where USB port 112 is provided for connection to USB port 105 of the e-marker device. Also shown in FIG. 1 is cable 113 attached to cradle 1B with USB port 114 at its other end. In this manner, cradle 1B can be connected to an external gateway devices such as a personal computer and the like for accessing the user's e-marker account over an internet connection.

With the e-marker device connected to cradle 1B via the pair of USB ports, 105, 112, the e-marker device can transfer user marked data (for example, data marks) to the user's e-marker account by connecting USB port 114 of cradle 1B to the personal computer or other peripheral device which can provide access to the user's e-marker account over an internet connection.

With increase in the different types of electronic devices that can be connected to a personal computer, the space requirement for accommodating all such devices at a user's desk at home or at a working area continues to rise. For example, with personal digital assistants (PDAs) such as Palm Pilots and Handspring Visors, generally, cradles are provided to allow the user to synchronize data from these PDAs to the user's computer such that data can be duplicated and stored on the user's computer for backup and storage purposes. The cradle connected to the user's computer usually by a short cable, requires some space near the computer such that it can remain connected to the user's computer for ease of data synchronization.

Indeed, while the PDAs provide one example, there are other handheld devices commercially available that require connection to a user's computer for purposes of data exchange, storage and the like. With the rise in the number of different types of such devices, the area near a computer's connection ports (generally found on the back panel of a personal computer, for example) and the vicinity around the computer itself is more cluttered and crowded. While the infra-red (IR) ports are provided with some devices and computers as well for data exchange therebetween, physical connection between the cradles of the handheld devices and the personal computers still remain the predominant connection presently available.

Given the above, it would be desirable to provide handheld, portable electronic devices such as e-marker devices that do not require a cradle for connection to a personal computer and the like for data exchange and storage.

SUMMARY OF THE INVENTION

In view of the foregoing, in one embodiment, an e-marker device is provided which incorporates the function and capability of a cradle such that the e-marker device can be directly connected to a gateway device such as a personal computer and the like for data communication and transfer.

An electronic music marker with integrated communication of one embodiment includes a housing having a main body portion and a cap portion, the cap portion pivotally mounted to the main body portion at a first edge such that the cap portion is configured to pivot about the first edge between an open position and a closed position, and a communication port connected to the housing via a retractable cable, where the housing substantially encases the communication port and the retractable cable when the cap portion is in the closed position.

In another embodiment, there is provided a method including pivotally mounting a cap portion of a housing to a main body portion of the housing at a first edge such that the cap portion is configured to pivot about the first edge between an open position and a closed position, and connecting a communication port to the housing via a retractable cable, where the housing substantially encases the communication port and the retractable cable when the cap portion is in the closed position.

These and other features and advantages of the present invention will be understood upon consideration of the following detailed description of the invention and the accompanying drawings.

BRIEF DESCRIPTION OF THE DRAWINGS

FIG. 1 illustrates an e-marker device and its cradle;

FIG. 2 illustrates one embodiment of an e-marker device with a retractable cord and hinged cap;

DETAILED DESCRIPTION

Figure 3:
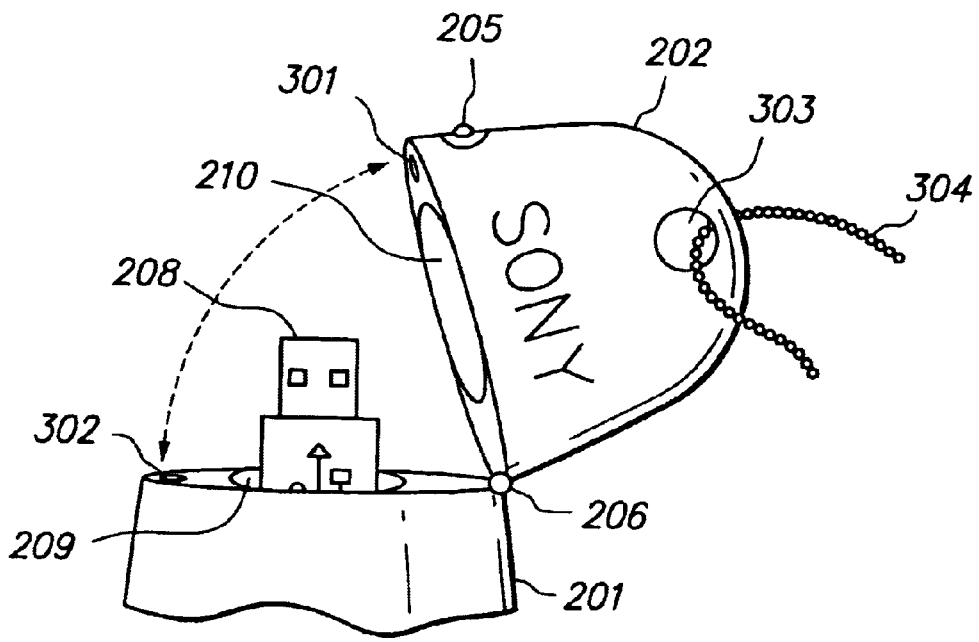
FIG. 3 illustrates the e-marker device of FIG. 2 with the hinged cap in an open position.

FIG. 2 illustrates one embodiment of an e-marker device with a retractable cord and hinged cap. Referring to FIG. 2, e-marker device 200 is provided with main body portion 201 and cap portion 202. Cap portion 202 is connected to main body portion 201 by hinge portion 206 described in further detail below. Also shown in FIG. 2 is lock/release button 205 provided on cap portion 202. On main body portion 201, there are provided e-marker button 203 for user input commands and a pair of display panels 204a, 204b which are configured to display the number of user inputted e-marks and the type of registered broadcast station for the corresponding e-marks, respectively.

As discussed above, in uncapped position, by depressing the lock/release button 205 from a closed position (not shown), cap portion 202 may be opened from main body portion 201 as shown. In particular, when the user depresses lock/release button 205 and pushes cap portion 202 away from main body portion 201, cap portion 202 pivots away from main body portion 201 while still attached to main body portion 201 at hinge portion 206. Thereafter, USB port 208 connected to main body portion 201 by retractable cord 207 may be taken out of USB port housing portion 209 (for example, a cavity in the main body portion) of main body portion 201 for connection to a corresponding USB port (not shown) of a personal computer and the like.

In this manner, in one embodiment, the use of a cradle can be eliminated and e-marker device 200 can be directly connected to the personal computer for data exchange and transfer. Indeed, by physically integrating USB port 208 with retractable cord 207 for direct connection to a user's personal computer, the use of a cradle can be eliminated. Retractable cord 207 is provided with sufficient length so as to easily connect USB port 208 to the user's personal computer while the user holds e-marker device 200 in the user's hand.

Figure 4:
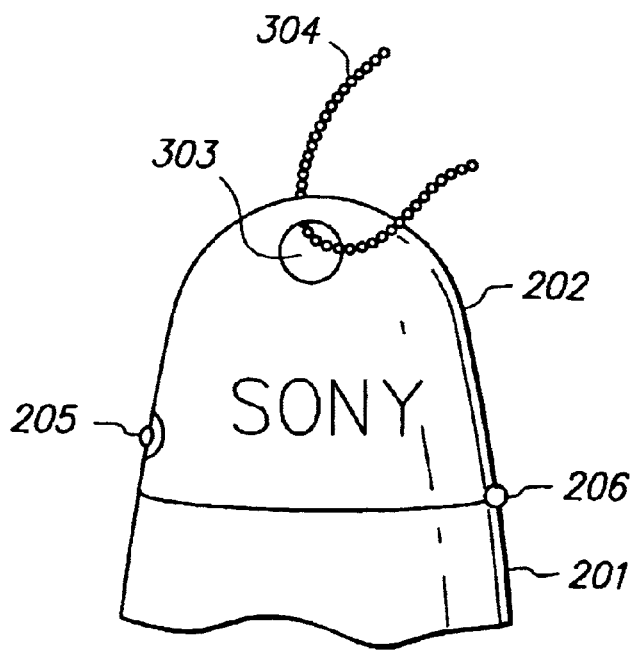
FIG. 4 illustrates the e-marker device of FIG. 2 with the hinged cap in a closed position.

FIGS. 3 and 4 illustrate one embodiment of e-marker device 200 of FIG. 2 with hinged cap portion 202 in open and closed positions, respectively. As shown, in the open position of FIG. 3 with USB port 208 secured in USB port housing portion 209 of main body portion 201 in e-marker device 200, cap portion 202 may be pivotally rotated about hinge portion 206 such that sufficient clearance can be provided for USB port 208 to be taken out of USB port housing portion 209 of main body portion 201. Furthermore, cap portion 202 is provided with cap portion cavity 210 sufficient in size for receiving protruded portion of USB port 208 in the housed position such that cap portion 202 may receive the entire protruded portion of USB port 208 in the housed position.

Referring back to FIG. 3, lock/release portion 205 is provided with latch portion 301 which is configured to latch with latch receiving portion 302 provided on main body portion 201. In one embodiment, lock/release portion 205 of cap portion 202 is integrally coupled with latch portion 301 in a spring biased manner such that when the depression of lock/release portion 205 is removed (for example, by removing a user's finger from applying pressure on lock/release portion 205), lock/release portion 205 is configured to return to its original position by the spring loaded mechanism (not shown).

Accordingly, when retractable cord 207 and USB port 208 are completely housed in main body portion 201, cap portion 202 may be pivoted in the counter-clockwise rotation such that latch portion 301 fixedly latches with latch receiving portion 302. In this manner, as shown in FIG. 4, cap portion 202 can be securely latched to main body portion 201 in the closed position completely encasing retractable cord 207 and USB port 208.

Referring back to FIGS. 3 and 4, further shown is hole 303 provided substantially at the edge position of cap portion 202 its edge position such that link chain 304 can be looped through hole 303 to allow the user to attach e-marker device 200 to a key chain or the like. Furthermore, since cap portion 202 is securely latched to main body portion 201 of e-marker device 200 by the latch mechanism comprising, for example, latch portion 301 and latch receiving portion 302, cap portion 202 can be prevented from accidentally opening.

Figure 5:
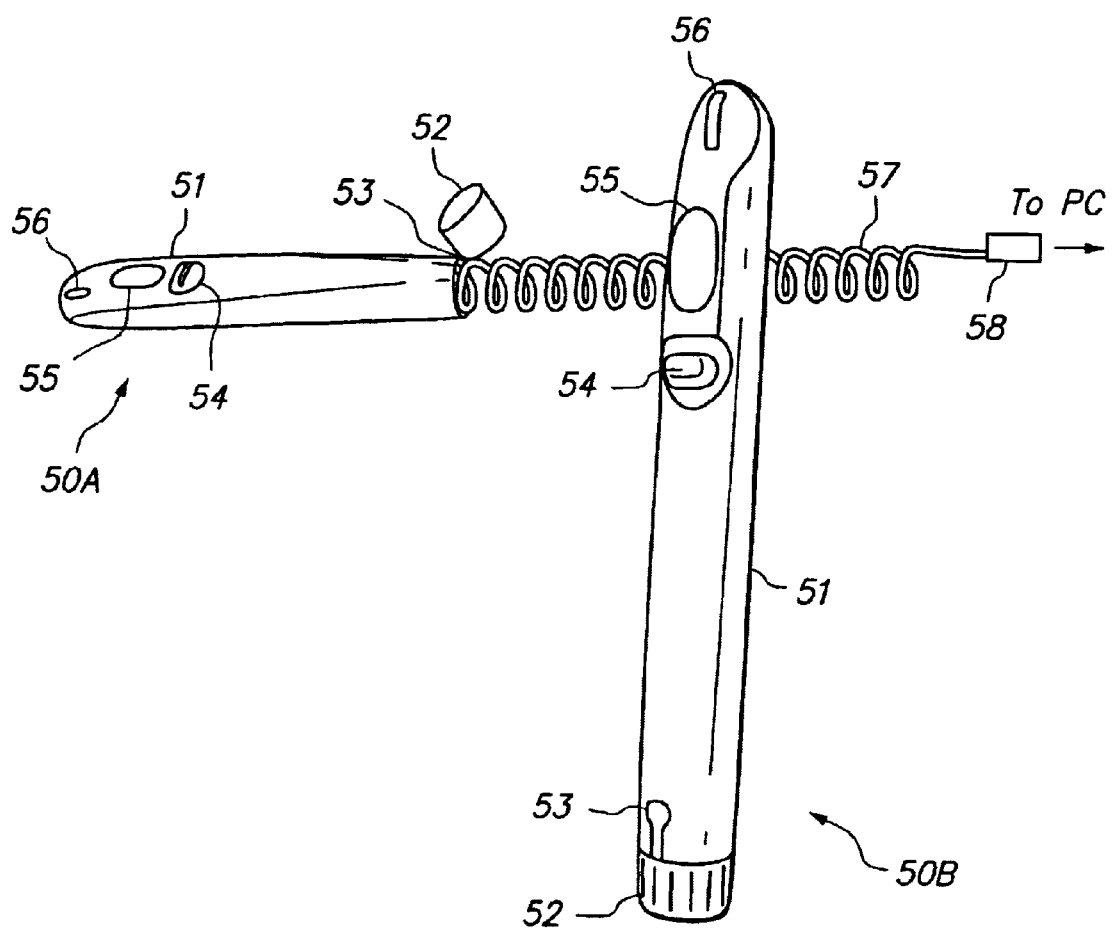
FIG. 5 illustrates another embodiment of an e-marker device.

FIG. 5 illustrates another embodiment of the e-marker device. As can be seen, there is provided an e-marker device shown in opened position 50A and closed position 50B. Similar to the device shown in FIG. 2, the e-marker device shown in FIG. 5 includes main body portion 51 and cap portion 52. Cap portion 52 is pivotally connected to the main body portion 51 by hinge mechanism 53 such that cap portion 52 may be opened and closed by rotating cap portion 52 about hinge mechanism 53. Also provided on main body portion 51 is e-button 54 for user input commands and display panel 55. In one embodiment, display panel 55 may be configured with a liquid crystal display panel (LCD), for example, for displaying text and image information corresponding to the user's input commands on display panel 55. Furthermore, key chain hole 56 is also provided on cap portion 52 such that the user can conveniently attach the e-marker device to a key chain and the like to improve portability.

As can be seen by comparing the two illustrations in FIG. 5, when cap portion 52 is opened (50A), the user is able to access USB port 58 connected to main body portion 51 by retractable cord 57 for direct connection to a personal computer and the like. On the other hand, when USB port 58 and retractable cord 57 are returned to main body portion 51, cap portion 52 may be pivotally rotated to completely encase USB port 58 and retractable cord 57 within main body portion 51.

In operation, when the user wishes to transfer the e-marked data marks from the e-marker device 200 to the user's e-marker account via a gateway device connected to the internet, the user depresses lock/release portion 205 on cap portion 202 of e-marker device 200. With a slight pressure from the user's finger onto cap portion 202 substantially near lock/release portion 205, cap portion 202 pivots about hinge portion 206 and cap portion 202 opens, exposing USB port 208.

Cap portion 202 is configured such that when in an open position, USB port 208 is substantially completely exposed to be able to connect to a corresponding USB port at the gateway device. Having opened cap portion 202, the user may then connect USB port 208 of e-marker device 200 to a corresponding USB port of the gateway device connected to the internet. Thereafter, when the user enters the user's e-marker account information and accesses the user's e-marker account via the gateway device, the user may transfer the data marks representing "bookmarked" music pieces broadcast over radio or television stations, and thereafter, the information related to the bookmarked music pieces may be displayed at a display terminal (not shown) of the gateway device. The information related the bookmarked music pieces may include, for example, the title of the music piece, the name of the artist of the bookmarked music piece, the name of the album of the bookmarked music piece, billboard chart information related to the bookmarked music piece, and ordering information to purchase a CD of the music piece such as a direct website link information to a vendor such as Amazon.com and CDNow.

Further information relating to the operation of the e-marker device can be found in pending application Ser. No. 09/126,007 filed on Jul. 29, 1998 and application Ser. No. 09/401,103 filed on Sep. 22, 1999, both assigned to Sony Corporation, joint-assignee of the present application with Sony Electronics, Inc., a subsidiary of Sony Corporation, the disclosures of each of which are herein incorporated in their entirely by reference for all purposes.

While the e-marker device with an integrated retractable cord is described above with a USB interface communication port, in one embodiment, the interface communication port may include other types of interface communication ports such as a serial port, and an infra-red (IR) port for wireless connection. Furthermore, in one embodiment, wireless communication ports for e-marker device may include Bluetooth ports which uses low power radio frequency to enable wireless connection between devices up to approximately 33 feet, and configured to connect to a gateway device such as a personal computer, a personal digital assistant (PDAs), a web-enabled television set, a mobile telephone with wireless internet access.

Additionally, in one embodiment, a display panel and an input button are provided on the housing, where the user can input a user command using the input button and in accordance thereto, a corresponding data information is displayed on the display panel. The display panel may be configured to illuminate when the data information corresponding to the user input command is displayed on the display panel.

In the manner described above in one embodiment, a USB port and a connection cable such as a retractable cord may be integrated with the e-marker device without sacrificing the functionality of the e-marker device such that the need for a cradle to connect the e-marker device to a personal computer and the like can be eliminated.

Furthermore, since the USB port is retractably integrated into the e-marker device, a user can significantly enhance the portability of the e-marker device, eliminating the need for a cradle connected to a personal computer to access the user's e-marker account over the internet. Indeed, a user can easily connect the USB port integrated into the e-marker device to any personal computer or devices that have corresponding USB port and access to the internet to allow communication between the e-marker device and the user's e-marker account.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An electronic music marker device with an integrated communication port, comprising:

a housing including a main body portion and a cap portion, said cap portion pivotally mounted to said main body portion at a first edge such that said cap portion is configured to pivot about said first edge between an open position and a closed position; and a communication port connected to said housing via a retractable cable;

wherein said housing substantially encases said communication port and said retractable cable when said cap portion is in said closed position.

2. The device of claim 1 further including a lock/release mechanism coupled to said cap portion for locking and releasing said cap portion to and from said main body portion.

3. The device of claim 2 wherein when said cap portion is in said closed position, said lock/release mechanism is configured to latch a second edge of said cap portion to said main body portion of the housing, and further, wherein when said cap portion is in said open position, said lock/release mechanism is configured to unlatch said second edge of said cap portion from said main body portion of the housing.

4. The device of claim 2 wherein said lock/release mechanism is spring biased.

5. The device of claim 1 further including a hinge, said hinge pivotally coupling said cap portion to said main body portion.

6. The device of claim 1 wherein said communication port includes one of a Universal Serial Bus (USB) port, a serial port, an infra-red (IR) port, and a Bluetooth port.

7. The device of claim 1 wherein said communication port is configured to connect to a gateway device for data communication therewith.

8. The device of claim 7 wherein said gateway device includes one of a personal computer, a personal digital assistant, an television set, a mobile telephone, a pager, and a wireless communication device.

9. The device of claim 1 further including a display panel and an input button each provided on said main body portion of said housing, said input button configured to input a user command, and said display panel configured to display a corresponding information responsive to the user command via said input button.

10. The device of claim 9 wherein said display panel is configured to illuminate the displayed information responsive to the user command.

11. A method of assembling an electronic music marker device, comprising the steps of:

pivotally mounting a cap portion of a housing to a main body portion of said housing at a first edge such that said cap portion is configured to pivot about said first edge between an open position and a closed position; and connecting a communication port to said housing via a retractable cable;

wherein said housing substantially encases said communication port and said retractable cable when said cap portion is in said closed position.

12. The method of claim 11 further including coupling a lock/release mechanism to said cap portion for locking and releasing said cap portion to and from said main body portion.

13. The method of claim 12 wherein when said cap portion is in said closed position, said lock/release mechanism is configured to latch a second edge of said cap portion to said main body portion of the housing, and further, wherein when said cap portion is in said open position, said lock/release mechanism is configured to unlatch said second edge of said cap portion from said main body portion of the housing.

14. The method of claim 12 further including biasing said lock/release mechanism with a spring mechanism.

15. The method of claim 11 wherein said pivotally mounting step includes coupling a hinge between said cap portion and said main body portion.

16. The method of claim 11 wherein said communication port includes one of a Universal Serial Bus (USB) port, a serial port, an infra-red (IR) port, and a Bluetooth port.

17. The method of claim 11 further including connecting said communication to a gateway device for data communication therewith.

18. The method of claim 17 wherein said gateway device includes one of a personal computer, a personal digital assistant, an television set, a mobile telephone, a pager, and a wireless communication device.

19. The method of claim 11 further including:

receiving an input command; and displaying a data mark corresponding to said received input command.

20. The method of claim 19 wherein said displaying step includes illuminating a display panel on said housing.

21. An electronic music marker device with an integrated communication port, comprising:

housing means including main body means and cap means, said cap means pivotally mounted to said main body means at a first edge such that said cap means is configured to pivot about said first edge between an open position and a closed position; and communication means connected to said housing means via a retractable cable;

wherein said housing means substantially encases said communication means and said retractable cable when said cap means is in said closed position.

* * * * *